Figure 2:
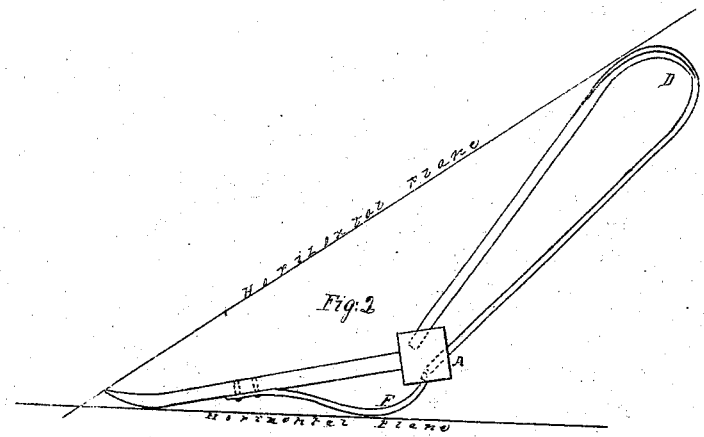

Sheet.1. 2 Sheets
D. Smith.
Revolving Rake.
N° 773. Patented Jun. 7, 1838.
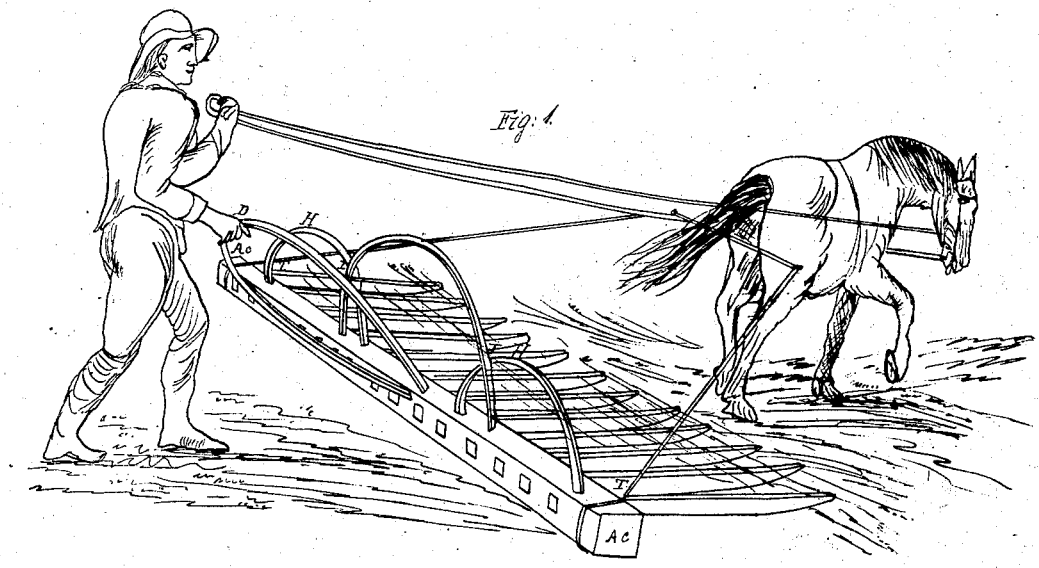
Fig. 1.
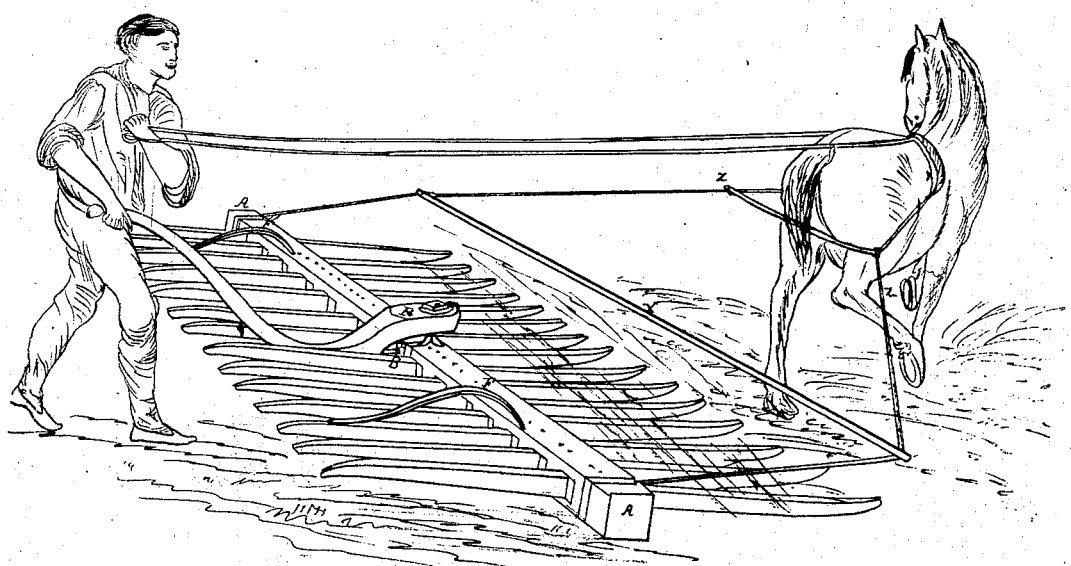

Sheet 2 - 2 Sheets

D. Smith.
Revolving Rake.

Nº 773                    Patented Jun. 7, 1838.

UNITED STATES PATENT OFFICE.

DANIEL SMITH, OF VINCENNES, INDIANA.

HAY-RAKE.

Specification of Letters Patent No. 773, dated June 7, 1838.

*To all whom it may concern:*

Be it known that I, DANIEL SMITH, of Vincennes, Indiana, have invented new and useful improvements in grain-rakes for raking wheat, rye, oats, barley, peas without cutting, rice, buckwheat, flax, and hemp if rotted in meadows, and many other articles, without rubbing out the grain or rubbing off the lint or leaves.

First, as to the revolving rake. Take a piece of scantling 13 feet long, 4½ or 5 inches square, of the lightest cross grained wood, such as poplar, (whitewood,) for the beam or head of the rake A A. Lay this beam level, and strike a line in the center from end to end. Plumb from this line at both ends, mark below, turn the underside of the beam up and strike a line from the marks. Measure off 6 inches from each end of the beam, and that will leave 12 feet between the centers of the two outside teeth. There are 16 teeth, which are at equal distances from each other, except the two center ones which are ten inches apart to give room for the piece B and handle R. Mark on the beam the places for the teeth, and from each of these marks scribe around and mark the places where the scribe crosses the line on the opposite side of the beam, and then with a screw auger one inch and ⅜ths wide, bore from those places half way through from each side for the teeth; this is to prevent wind or twist in the teeth, for should there be any, one end of the teeth will run on the plane and the other in the air. The holes must be square, if the teeth are of one piece; but if they are of two pieces as in the drawing, the holes should be longer accordingly lengthwise the beam. Make a mortise through the beam close to the left middle tooth for the piece B, and a groove in the middle between the two center teeth for the handle R. At this place the beam is left square; pieces are nailed on each square inside this groove to keep the handle to its place, and the balance may be of 8 sides or otherwise. A groove is cut around near each end to put the rope Z Z in.

Figure 5:
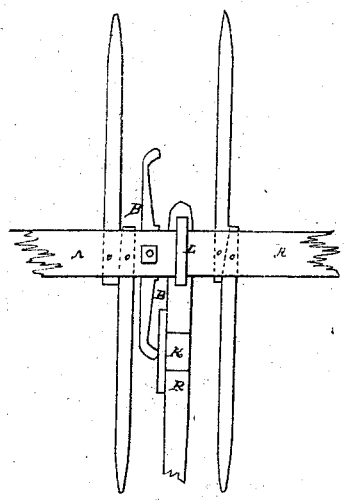

Figure 3 is a half tooth for the revolving rake. By making the teeth out of two pieces, natural crooks can be had for the points, which would be best. The teeth are straight from the top to within 6 or 7 inches of the points, and are then turned up an inch and a half as at F. They are made by a pattern. They are an inch and a half square at the end which goes into the beam, and from there to the points an inch and a quarter. If they are made in two pieces, the sides that go together must be sloped a little to drive tight, (see the drawing,) and are bored with a small auger and pinned to keep them in their place. From point to point, they are 5 feet 6 inches. Fig. 5 is a tooth of the above description made out of one piece of wood.

The following are the means to elevate the beam or head of the rake to any given height, from half a degree to 60 or 70 degrees above a horizontal plane. This is done with bows of wood shod with iron or iron laid with steel and hardened if the ground be stony, or with plank an inch and a half thick cut in the shape of the bows, fastened to the teeth and underside of the beam, or with any thing else.

Fig. 2 is a wood bow an inch and a quarter broad and one inch thick, shod with iron. The bows are put through the beam between the third teeth from the end, or close to the outside of those teeth, or one may be put on the outside of the fourth tooth from the ends. A plumb is held 5 inches from the beam in front, and the place where the plumb line touches the bow is the point that should run on the plane to balance the rake when in operation. See Fig. 2. The teeth can be run over the field without touching the ground, over corn stalks, stumps a foot high, &c. A space of 7 inches between where the said plumb line strikes the bow and the tooth, answers for raking grain; it elevates the beam 10 or 11 inches; the grain will then slide upon the teeth, and the elevation of the beam will prevent it from rubbing out the grain. The bows are put in the beam through holes bored a little slanting backward from the underside, and are fastened to the teeth 7 and 8 inches from their points with nails or tied with wire.

The piece B is 20 inches long and made of iron or wood. If made of wood, one inch and a half thick by two broad will answer. It is turned a little to the right at both ends and put through the beam close to the left middle tooth. A bolt is put through the beam and center of this piece, with a screw top to prevent the beam from splitting.

Figure 4:
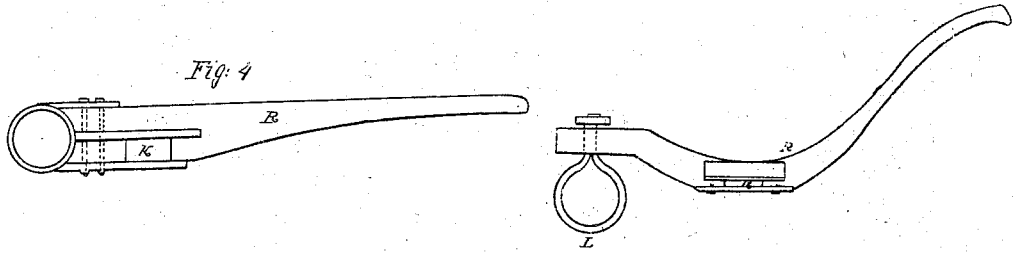

Fig. 4. R is a handle 5 feet long and one inch and a half thick, with one end as broad as the diameter of the beam. It is hollowed out to fit the beam. The end of B is fitted to a mortise which is made at K. The block above the mortise is a piece of wood or iron projecting over 2 inches. This is to be put on the piece B to arrest the rake when in operation. An iron is made to fit the beam and handle R; two small bolts are put through the iron and handles, with screw tops as at L.

The last are the ropes and the pole X. The ropes are looped in the grooves near each end of the beam. The rake is thus turned around at the ends of the field much better than if the ropes were hitched at any other point. The pole X is tied to the ropes a little distance from the teeth, to keep the ropes extended and let the rake revolve. The ropes are from 13 to 15 feet long. The pole is of the lightest wood.

These rakes every part may be made longer or shorter, larger or smaller.

Second. A° A°, Fig. 1, is a rake half revolving with single pointed teeth. Fig. 3 is a tooth 3 feet long, made straight at the top to within 5 or 6 inches of the point. It is turned up one inch and a half to prevent the tooth from running in the ground. The beam or head of the rake, the bows or springs that elevate it, and the teeth, are all described above, except that there are no grooves cut around this beam. Fig. 2 is an end view of this rake. After the teeth and sliders F are in this beam, it is turned the underside up and is bored in the center between the two middle teeth for the bow D to e. The butt end of this bow is one inch and a half square and the small end is put to the right or left of it. The middle bow H presses against the back part of the bow D at I, the two end bows H H press against the back part of the middle bow, and are all tied together to support the bow D when turned on the plane c e. The bow D is 4 feet from the beam to where it runs on the plane at e, and there it should be shod with iron; the beam is 15 inches from this plane. See Fig. 2. The middle bow is 18 inches from the beam at I, and the two end bows 12 inches from the beam, at the center. Cords are tied to the beam and the two end bows to prevent the grain from passing through when raking. Tough hoop poles will answer for the bows in this rake, put in a hole made with an inch and a quarter auger. The ropes are looped on the two outside teeth T T, brought back under the beam over the top and between the rope and teeth. This will help to keep the beam balanced.

*How to use the above rakes.*—Cut the grain level and clean with a cradle, or with a naked scythe (if the grain is lodged,) or otherwise; hitch a horse to the ends of the ropes of the revolving rake Z Z; take hold of the handle R and put it on the piece B; drive in between two swaths. When the rake is full, a slight lift with the hand will turn it over, and the back teeth now become the front. Put the handle R on the piece B as before, fill again as before, and so on through the filed. On your return, stop opposite your first bunches on account of loading; move the second or third row of bunches to make room for a wagon or slide; take three or four pronged forks either of wood or iron or steel; hold the prongs one above the other, and stick the fork into the sides of these bunches. Two hands to pitch together and one to load, can thus put the grain on a wagon in less time than it would take them to bind it.

If the grain is to be stacked, the butts should be kept the same way on both sides of the wagon. In stacking, keep the middle full, and lay the butts nicely around the outside. Three or four days after the stack is settled, one hand on the top of the stack and one below with a cloth to save the grain, should beat off the loose heads with a hoop pole, which they can do in a very little time. The stack will save as well as if the grain were bound into sheaves. After the wheat is taken out of the field, the rake is run over where the bunches lie. The grain when cut is left to dry in the swaths one day in fair weather; if too ripe, rake in the mornings and evenings. The grain is handled altogether with forks and not with hands, after it is raked. One acre can be raked in this way in less than 15 minutes, (if the swaths are 40 rods or longer) clean and nice.

As to the other rake, Fig. 1: Take hold of the handle D, and after the horse is hitched to the ropes Z Z, drive between two swaths. When the rake is full, a slight lift of the hands will turn it over on the bow D, and it will slide over the grain. When the points are past the bunches, the rake is drawn back with the hand, filled again and so on.

By following the above plan, one half of the expense of harvesting is saved, and if the grain is threshed with horses, one hand can lay it on the floor as fast as three could, if it were bound in sheaves. It is also easier turned with forks, and is threshed full as fast.

Fig. 6. The dots are pins put into a block to bind the bows or springs that are used to elevate the head of the rake.

Fig. 7 is iron or wood to put on the tooth and bows to keep them to their places until they are fastened.

What I claim as my invention and desire to secure by Letters Patent is—

The method of arresting the revolution of the rake by means of the handle R and piece B, constructed and operating as herein described; and also the springs or runners F attached to the teeth upon which the rake slides as herein described.

DANIEL SMITH.

Witnesses:
 JAMES S. MAYES,
 JOHN ROSS.